United States Patent [19]

Wenzel

[11] Patent Number: 4,613,031

[45] Date of Patent: Sep. 23, 1986

[54] DEVICE FOR SORTING FISH

[75] Inventor: Werner Wenzel, Lübeck, Fed. Rep. of Germany

[73] Assignee: Nordischer Machinenbau Rud. Baader GmbH & Co. KG, Lübeck, Fed. Rep. of Germany

[21] Appl. No.: 651,212

[22] Filed: Sep. 14, 1984

[30] Foreign Application Priority Data

Sep. 17, 1983 [DE] Fed. Rep. of Germany ....... 3333740

[51] Int. Cl.$^4$ ............................................. B65G 47/24
[52] U.S. Cl. ....................................... 198/399; 17/24; 17/55
[58] Field of Search .................... 198/399, 400; 17/24, 17/55

[56] References Cited

U.S. PATENT DOCUMENTS

| 1,430,011 | 9/1922 | Heath | 198/400 |
| 3,498,442 | 3/1970 | Eriksen | 198/400 |
| 3,967,724 | 7/1976 | Allen et al. | 198/399 X |

FOREIGN PATENT DOCUMENTS 1292070  4/1969  Fed. Rep. of Germany ...... 198/400

Primary Examiner—Joseph E. Valenza
Assistant Examiner—D. Glenn Dayoan
Attorney, Agent, or Firm—Thomas R. Morrison

[57] ABSTRACT

A device for sorting fish into uniform head-tail alignment is characterized by a truncated conic disc driven rotatingly about a horizontal axis, which disc, with its corundum-coated smaller frontal surface in connection with a gripping surface fixed to the frame of the device and opposing the frontal surface in the region above the axis, forms a gripping gap into which fish supplied with their tail end leading are introduced with their tailfins. Due to the rotation of the truncated conic disc the tail part of the fish is entrained by frictional engagement. During that process the fish is gradually placed on its tail so that a shift into the head-first position occurs, in which position the fish is set free at the end of the gripping surface.

20 Claims, 3 Drawing Figures

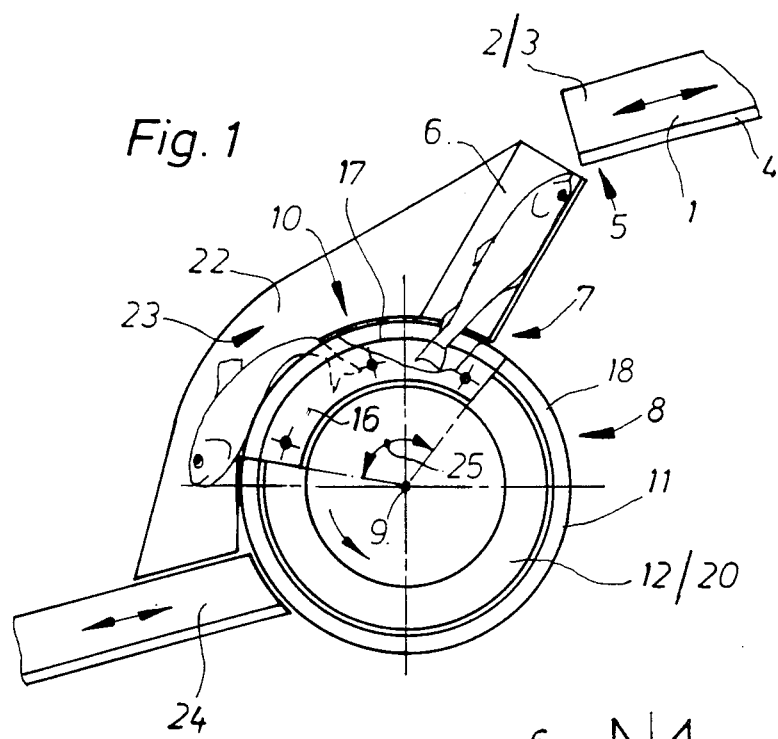
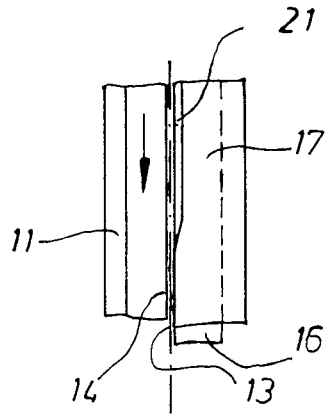
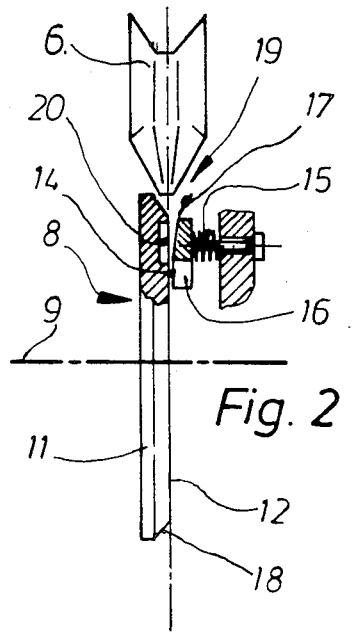

1

DEVICE FOR SORTING FISH

BACKGROUND OF THE INVENTION

1. Field of the Invention

The invention concerns a device for sorting fish delivered unsorted and conveyed in the direction of their longitudinal axis into uniform head-tail alignment by turning any fish supplied tail first, the device comprising a driven clamping and turning device for seizing the tail region of fish fed tail first and turning the latter into head-first position, the clamping and turning device comprising a disc body driven to rotate about an essentially horizontal axis and defining a gripping gap.

2. Description of Prior Art

Such a device can be taken from German Offenlegungsschrift No. 32 29 502, corresponding to my copending U.S. patent application Ser. No. 520,111, filed Aug. 3, 1983. The turning device used in this known device comprises a rotatingly driven clamping member including a plurality of pincer elements which cooperate with a rotating disc opposing them and form a clamping gap running perpendicular to their axis of rotation, which clamping gap can be closed in a region extending approximately from the highest point of the clamping member in its turning direction over an orbit sector of approximately 90°.

In practical use this clamping member has shown that after a relatively short time functional disturbances occur due to unavoidable soiling, which disturbances become apparent in the increasing number of fish aligned incorrectly. This is caused by fish scales, additional catch etc. intruding into the clamping gap so that the tail fins fed to the latter are not gripped securely and therefore a turning cannot be guaranteed.

3. Objects of the Invention

It is a main object of the present invention to avoid such disturbances. It is a further object to suggest a device of a rather simple structure and high reliability over long working periods.

SUMMARY OF THE INVENTION

According to the present invention these objects are achieved in a device for sorting fish delivered unsorted and conveyed in the direction of their longitudinal axis into uniform head-tail alignment by turning any fish supplied tail first, the device comprising a driven clamping and turning device for seizing the tail region of fish fed tail first and turning the latter into head-first position, the clamping and turning device comprising a disc body driven to rotate about an essentially horizontal axis and defining a gripping gap by the improvement that the driven disc body comprises a front surface with skid resisting properties over at least part of it, a gripping surface being opposed to the frontal surface and arranged, at least in the region above the axis of the disc body, leaving an essentially parallel gripping gap with respect to the front surface.

The advantages thus achieved consist especially in that the gripping gap undergoes a continuous self-cleaning due to the relative speed of the surfaces forming the gap and due to its arrangement merely with regard to one part region of the disc body, as well as in that this embodiment is not very costly and has a greater resistance to wear.

In a further embodiment of the invention it is advantageous, for constructional reasons, if the gripping surface is formed as a disc segment whose largest diameter corresponds essentially to that of the frontal surface of the disc body.

In order to safeguard a defined clamping force in adaptation to differing fish sizes the disc body and the gripping surface may be arranged resiliently deflectable to each other.

In order to achieve a uniformly exact introduction of the tail fin the gripping gap may be formed as a wedge-shaped gap broadening towards the greatest diameter preferably in the region of the highest point of the frontal surface of the disc body. In this way a funnel effect is achieved. In this context the wedge-shaped gap may lead into the gripping gap in the rotation of the disc body in order to achieve a more improved entry of the tail fin in the clamping zone.

It is constructionally and functionally expedient if the disc body has the shape of a truncated conic disc whose smaller basic surface forms the frontal surface opposing the gripping surface.

An especially long life and great resistance to wear of the disc body is achieved if its frontal surface is provided, at least partly, i.e. at least in the region of the gripping surface, with a corundum coating.

In order to guarantee a particularly safe and uniform introduction of the tail fin into the gripping gap a guiding surface can be associated to the gripping surface at least in the region of the latter's highest point, which guiding surface, together with the circumferential surface of the disc body, forms a funnel-shaped channel concentrical to the axis, the wedge-shaped gap resp. the gripping gap being positioned at the bottom of this channel.

For reasons of constructional simplicity and economical maintenance of the device the disc segment of the gripping surface may comprise a sector extending at least from a supplying channel for the fish in the turning direction of the disc body and have a central angle of approximately 80° to 120°.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows a partially sectional side view of a turning device according to the present invention, FIG. 2 shows a partial cross-section through the turning device of FIG. 1 and FIG. 3 shows a partial top view of the turning device without the feeding channel.

DETAILED DESCRIPTION OF THE PREFERRED EMBODIMENT

A feeding channel 1 running at an inclination and comprising two wall parts 2 and 3 facing each other in a V-shaped arrangement is arranged in a not-shown frame of a device for sorting fish, the wall portions 2 and 3 being driven independently to oscillate, preferably in opposite directions and leaving a narrow shaftlike gap 4 at their bottom. A more steeply inclined supplying channel 6 having an essentially trapezoid-shaped cross-section is arranged downstream of the lower end 5 of the feeding channel 1, the lower end 7 of the supplying channel 6 being associated to a clamping and turning device 8 driven pivotally about an axis 9. This association is such that the bottom of the supplying channel 6 approximately points to the axis 9.

The clamping and turning device 8 comprises a clamping member 10 comprising a rigid disc body 11 attached to the axis 9 and having the form of a truncated conic disc, and a gripping surface 13. The latter is fixedly opposed to the smaller one of two frontal surfaces 12 of the disc body 11 and forms a gap 14 with this frontal surface 12, which gap can be broadened elastically by springs 15. The latter support a structural element 16 which forms the gripping surface 13. The structural element 16 is formed as a disc segment which opposes a sector 25 having a central angle of 100° of the frontal surface 12 of the disc body 11 positioned above the axis 9. The structural member 16 is surrounded by a guiding surface 17 which, with a circumferential surface 18 of the disc body 11, forms a channel 19 for guiding the fish. The gripping gap 14 is positioned at the bottom of this channel 19. The frontal surface 12 limiting the gripping gap 14 at one side is provided at least partially with a corundum covering 20 or is formed by a corundum body. In the region where the supplying channel 6 joins the clamping member 10 the gap 14 is formed as a wedge-shaped gap 21 broadening to the outwards which is converted into the gap 14 in the direction of movement of the disc body 11. Adjoining the supplying channel 6 leading surfaces 22 arranged fixedly to the frame are provided on both sides of the clamping member 10 and surrounding its periphery, which leading surfaces 22 form a transition channel 23 on whose bottom the gripping gap 14 resp. the gap 21 is positioned. This transition channel 23 is only vaguely shown in FIG. 1 for the sake of clarity. It runs into a discharge channel 24 attached to the frame.

The method of operation of the device is the following:

The fish to be aligned resp. sorted e.g. for the automatic delivery to a fish processing machine are delivered to the feeding channel 1 in a suitable manner and, depending on the inclination and oscillation movement of this channel, guided by this in the direction of their longitudinal axes to the supplying channel 6, via which the fish are supplied to the clamping and turning device 8. When they arrive at this device they are handled differently depending on whether they strike the clamping member 10 of this device head or tail first. Any fish sliding head first cannot intrude into the gripping gap 14 resp. gap 21 due to the blunt shape of its head. Further, due to the shape, of the lower end 7 of the supplying channel 6, such head-leading fish is pressed out of the latter into the transition channel 23 formed by the leading surfaces 22. On the other hand, the tail fin of a fish arriving tail first, as shown in the upper part of FIG. 1, intrudes into the gripping gap 14 resp. the gap 21. The rotation of the clamping member 10 now effects that the essentially frictional entraining of the fish by its tail part ensues by the corundum coating 20 of the frontal surface 12 of the disc body 11. The tail part sliding along the gripping surface 13 is thereby guided out of the region of the wedge-shaped gap 21 into the region of the parallel gripping gap 14 such that a firm grip ensues. The fish thus gripped or seized is drawn—as shown in FIG. 1—into the transition channel 23 in the further course of the rotation so that, under the influence of gravity and guided laterally by the leading surfaces 22, it glides into the channel 19 forming the periphery of the clamping member 10. Having surmounted the highest point of the orbit of the clamping member 10 the fish is placed increasingly on its tail until finally a turnover into the hanging position shown on the left in FIG. 1 occurs. The fish is then released from this position when it has reached the end of the gripping surface 13. The freed fish is then guided into the discharge channel 24 head first and, together with the fish already supplied head first, guided e.g. to a beheading, nobbing or filletting machine.

If necessary, an alignment into belly-back position can be carried out in addition before a delivery to one of the named processing machines. For this purpose suitable devices known from prior art can be arranged in-line. In order to improve the performance several of the described units can be arranged parallel to each other, the discs 11 being carried by a common shaft.

What is claimed is:

1. A device for sorting into uniform head-tail alignment, a plurality of fish each having a relatively thick, blunt head, a relatively thin tail and a body extending along a longitudinal axis defined therebetween, with said fish being delivered to said device along their longitudinal axes in a random head-leading and tail-leading orientation, and with said device being adapted to sort said fish into uniform head-tail alignment by turning any of said fish as are led thereto with tail leading to a head-leading position, said device comprising:

a supplying channel for receiving individually each of said fish led to said device, driven clamping and turning means for seizing the tail region of such fish as are received in the supplying channel in tail-leading position, and for turning such fish into head-leading position, outlet means for delivering said fish from said device, said supplying channel communicating with said clamping and turning means at a first junction position, and said outlet means communicating with said clamping and turning means at a second junction position, said clamping and turning means comprising a clamping unit having a defined diameter, and defining a gripping gap, wherein said clamping unit includes a disc having a frontal surface provided with skid resisting properties over at least part thereof and driven to rotate about a substantially horizontal axis in a defined direction of rotation, and a gripping surface fixedly opposed to said frontal surface to form said gripping gap therebetween said gripping surface being substantially parallel to said frontal surface and being positioned between said first junction position and second junction position at least in the region above said axis of said disc means said gripping gap having a width greater than the thickness of said fish tail and less than the thickness of said fish head.

2. A device as claimed in claim 1, wherein said gripping surface is formed as a disc segment whose largest diameter corresponds essentially to that of said frontal surface of said disc.

3. A device as claimed in claim 1, wherein said disc and said gripping surface are arranged resiliently deflectable relative to each other.

4. A device as claimed in claim 2, wherein said disc and said gripping surface are arranged resiliently deflectable relative to each other.

5. A device as claimed in claim 3, wherein said gripping gap is formed as a wedge-shaped gap broadening towards the greatest diameter of said disc in the region of the highest point of said frontal surface of said disc.

6. A device as claimed in claim 4, wherein said gripping gap is formed as a wedge-shaped gap broadening towards the greatest diameter of said disc in the region of the highest point of said frontal surface of said disc.

7. A device as claimed in claim 5, wherein said wedge-shaped gap is formed to lead into said gripping gap in said direction of rotation of said disc.

8. A device as claimed in claim 6, wherein said wedge-shaped gap is formed to lead into said gripping gap in said direction of rotation of said disc.

9. A device as claimed in claim 1, wherein said disc has the shape of a truncated conic disc whose smaller basic surface forms said frontal surface opposing said gripping surface.

10. A device as claimed in claim 2, wherein said disc has the shape of a truncated conic disc whose smaller basic surface forms said frontal surface opposing said gripping surface.

11. A device as claimed in claim 3, wherein said disc has the shape of a truncated conic disc whose smaller basic surface forms said frontal surface opposing said gripping surface.

12. A device as claimed in claim 1, wherein said frontal surface of said disc is provided with a corundum coating.

13. A device as claimed in claim 9, wherein said frontal surface of said disc is provided with a corundum coating.

14. A device as claimed in claim 11, wherein said frontal surface of said disc is provided with a corundum coating.

15. A device as claimed in claim 1, wherein guiding surface means are associated to said gripping surface at least in the region of the latter's highest point, which guiding surface means, together with a circumferential surface defined by said disc form funnel-shaped channel means concentrical to said axis, said gripping gap being positioned at a bottom formed within said channel.

16. A device as claimed in claim 3, wherein guiding surface means are associated to said gripping surface at least in the region of the latter's highest point, which guiding surface means, together with a circumferential surface defined by said disc form funnel-shaped channel means concentrical to said axis, said gripping gap being positioned at a bottom formed within said channel.

17. A device as claimed in claim 4, wherein guiding surface means are associated to said gripping surface at least in the region of the latter's highest point, which guiding surface means, together with a circumferential surface defined by said disc form funnel-shaped channel means concentrical to said axis, said gripping gap being positioned at a bottom formed within said channel.

18. A device as claimed in claim 5, wherein guiding surface means are associated to said gripping surface at least in the region of the latter's highest point, which guiding surface means, together with a circumferential surface defined by said disc form funnel-shaped channel means concentrical to said axis, said wedge-shaped gap being positioned at a bottom formed within said channel.

19. A device as claimed in claim 6, wherein guiding surface means are associated to said gripping surface at least in the region of the latter's highest point, which guiding surface means, together with a circumferential surface defined by said disc form funnel-shaped channel means concentrical to said axis, said wedge-shaped gap being positioned at a bottom formed within said channel.

20. A device as claimed in claim 2, wherein said disc segment of said gripping surface comprises a sector extending at least from said first junction position in said direction of rotation of said disc means and having a central angle of approximately 80° to 120°.

* * * * *